United States Patent [19]

Davis, deceased

[11] Patent Number: 4,562,125
[45] Date of Patent: Dec. 31, 1985

[54] BATTERY HOLD-DOWN STRAP AND TERMINAL PROTECTOR

[75] Inventor: Robert K. Davis, deceased, late of Kankakee County, Ill., by Clerie R. Davis, executor

[73] Assignee: Roper Corporation, Kankakee, Ill.

[21] Appl. No.: 695,089

[22] Filed: Jan. 25, 1985

[51] Int. Cl.[4] ............................................. H01M 2/10
[52] U.S. Cl. ..................................... 429/65; 429/121; 429/100; 180/68.5
[58] Field of Search ................. 429/65, 121, 122, 123, 429/100, 163, 175; 180/68.5

[56] References Cited

U.S. PATENT DOCUMENTS

| | | | |
|---|---|---|---|
| 2,124,631 | 7/1938 | Reed | 429/121 X |
| 2,671,819 | 3/1954 | Field | 429/65 |
| 3,105,567 | 10/1963 | Schultz, Jr. | 429/100 X |
| 3,956,576 | 5/1976 | Jensen et al. | 429/121 X |
| 3,991,844 | 11/1976 | Reynier | 180/68.5 |
| 4,508,794 | 4/1985 | Wright | 429/100 |

*Primary Examiner*—Anthony Skapars
*Attorney, Agent, or Firm*—David J. Richter

[57] ABSTRACT

A hold-down strap and electrical terminal protector for a storage battery including an elongated body having a length substantially equal to the length of the battery and a width substantially less than the width of the battery, a connecting portion at each end of the body adapted to receive and cooperate with a hold-down connector secured to means for supporting the battery and means inboard of the connecting portions for substantially enclosing each of the battery terminals, the terminal enclosing means including a selectively openable access cover. Preferably the body has a generally inverted channel shape including a pair of generally vertical longitudinal walls interconnected by at least one cross member, the terminal enclosing means are defined in part by the longitudinal walls and the access cover is disposed over and between the walls and means are provided for latching the cover adjacent the upper portion of the other wall.

20 Claims, 4 Drawing Figures

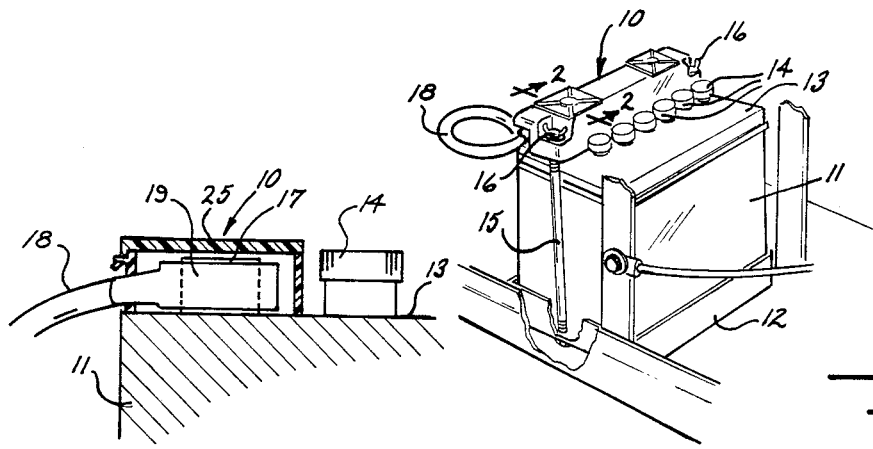
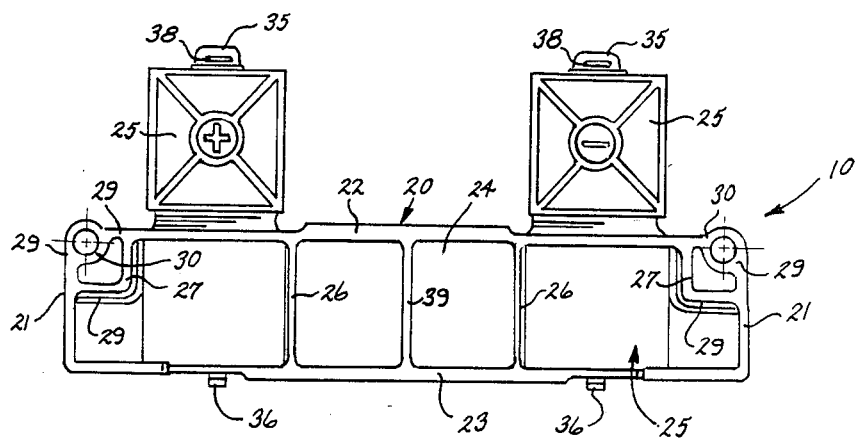
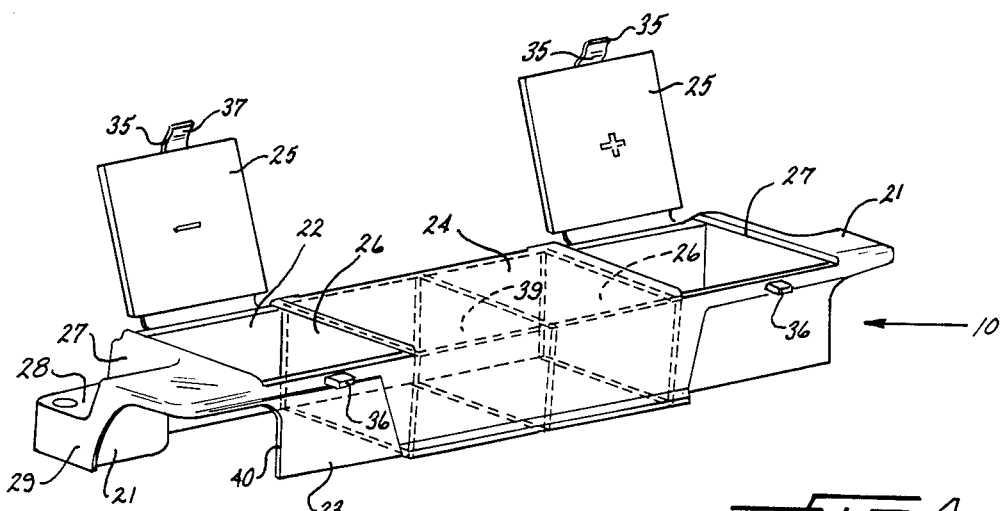

BATTERY HOLD-DOWN STRAP AND TERMINAL PROTECTOR

FIELD OF THE INVENTION

The present invention relates generally to battery hold-down devices and more particularly concerns a hold-down strap with terminal protecting enclosures.

BACKGROUND OF THE INVENTION

Lead-acid storage batteries are commonly used to provide the starting current for internal combustion engines such as those used in lawn and garden tractors and the like. It is desirable to secure the batteries firmly in place in such equipment and for this purpose a variety of battery hold-down straps, frames and covers have been employed. U.S. Pat. Nos. 1,424,144; 2,159,890; 3,105,567 and 3,298,454 are illustrative of such straps, frames and covers. Reference may also be made to U.S. Pat. Nos. 2,022,090; 2,629,759 and 3,657,020 for other aspects of battery covers not specifically involving hold-down devices.

In order to prevent short-circuits between the battery terminals and other components and also prevent electrical shocks to operating personnel, it is also desirable to protect the battery terminals and cable connections with insulating materials or covers. It is also desirable to protect the battery terminals and cable connectors from acid spills and other contamination which may cause terminal corrosion. One common past expedient for protecting the battery terminals both from electrical short-circuits and contamination has been to provide the battery cable ends with rubber or plastic "boots" which slip over the terminals after the cable ends have been connected to the terminals. It is necessary, of course, to remove such protective "boots" when it is desired to inspect the terminals and cable connections for tightness and corrosion and also when it is desired to make electrical contact with the battery terminals such as during electrical testing, charging or "jumping" the battery.

OBJECTS OF THE INVENTION

It is the primary aim of the present invention to provide a battery hold-down strap with integral terminal protecting enclosures each having a readily openable access cover which permits convenient inspection of the terminals and selective electrical connection thereto for testing, charging and "jumping" or the like. A more specific object is to provide such a combination hold-down strap and terminal protector which is made of insulating, corrosion resistant plastic material with the access covers formed integrally with hinges and cooperating latching means. It is also an object to provide the access covers with battery polarity indicia.

Another object of the invention is to provide a combination hold-down strap and terminal protector of the foregoing type which is strong and rugged and yet is relatively light-weight and economical to manufacture. More specifically, it is an object to form such a hold-down strap of relatively thin wall plastic material which utilizes a cross reinforced generally channel-shaped cross section to provide great strength and stiffness for its weight.

Still another object of the invention is to provide a combination hold-down strap and terminal protector wherein the terminal enclosing walls also serve as integral reinforcements to the strap and the strap ends are generally box-shaped with tubular, bolt receiving sleeves integrally formed in their corners.

These and other objects and advantages of the invention will become more readily apparent from reading the following detailed description and upon reference to the accompanying drawings.

SUMMARY OF THE INVENTION

A hold-down strap and electrical terminal protector for a storage battery having electrical terminals projecting from the upper surface thereof, comprising, an elongated body having a length substantially equal to the length of the battery and a width substantially less than the width of the battery, a connecting portion at each end of the body adapted to receive and cooperate with a hold-down connector secured to means for supporting the battery and means inboard of the connecting portions for substantially enclosing each of the battery terminals, the terminal enclosing means including a selectively openable access cover. In the preferred embodiment, the body has a generally inverted channel shape including a pair of generally vertical longitudinal walls interconnected by at least one cross member, the terminal enclosing means are defined in part by the longitudinal walls and the access cover is disposed over and between the walls and means are provided for latching the cover adjacent the upper portion of the other wall. The strap may be made of plastic material with the cover hinges and latch elements integrally formed therewith.

BRIEF DESCRIPTION OF THE DRAWINGS

FIG. 1 is a fragmentary perspective view of an electrical storage battery mounted in a piece of equipment and secured thereto by the novel combination hold-down strap and terminal protector of the present invention;

FIG. 2 is an enlarged partial cross section taken substantially along line 2—2 in FIG. 1;

FIG. 3 is a bottom plan view of the integrally formed hold-down strap and terminal protector shown in FIG. 1 with the respective terminal access covers hinged to their open positions; and FIG. 4 is an enlarged perspective view of the combination hold-down strap and terminal protector with the intermediate cross walls shown in broken lines.

While the invention is susceptible of various modifications and alternative constructions, a preferred embodiment has been shown in the drawings and will be described further below in detail. It should be understood, however, that there is no intention to limit the invention to the specific embodiment illustrated and described but, on the contrary, the intention is to cover all modifications, alternative constructions and equivalents as fall within the scope of the invention.

DESCRIPTION OF THE PREFERRED EMBODIMENT

Turning now to the drawings, there is shown in FIG. 1 a combination hold-down strap and terminal protector 10 of the present invention installed on a battery 11 mounted in a supporting frame 12 of a piece of equipment, such as a garden tractor or the like. The battery 11 is generally rectangular in shape with an upper surface 13 provided with a plurality of vent/fill caps 14 and positive and negative electrical terminals 17 (see FIG. 2) which project upwardly and to which suitable electrical cables 18 are connected as at 19. At each end of the battery a hold-down bolt 15 or other suitable connector is fastened at one end to the frame 12 and connected at its other end to the strap 10 with a wing nut 16 or the like to hold the battery 11 securely in place. It will be seen that the strap 10 extends over the length of the battery top surface 13 covering the terminals 17 but not the vent/fill caps 14. In other words, the strap width is substantially less than the width of the top surface 13 of the battery 11.

As shown in more detail in FIGS. 3 and 4, the hold-down strap 10 includes an elongated body 20 having a connecting portion 21 at each end adapted to receive and cooperate with a hold-down connector such as the bolt 15 and wing nut 16 secured to the battery supporting frame 12. The body 20 is preferably formed with a generally inverted channel shape including a pair of generally vertical longitudinal walls 22, 23 interconnected by a generally horizontal web 24.

Pursuant to the invention, the strap 10 is provided with means inboard of the end connecting portions 21 for substantially enclosing the battery terminals and each terminal enclosing means includes a selectively openable access cover 25 to permit inspection of the terminals and making electrical connections to the terminals for testing, charging and "jumping" or the like. In the preferred embodiment, each of the terminal enclosing means is defined, in part by the longitudinal walls 22, 23 and by a cross wall 26 extending therebetween. The body 20 also includes an endwall portion 27 at each end connected to one of the longitudinal walls 22 and defining a further portion of the terminal enclosing means.

The connecting portion 21 at each end of the body 20 extends outwardly from the end wall 27 and the longitudinal wall 22 and is preferably formed with a substantially flat top portion 28 and generally box-like vertical side walls 29. A generally cylindrical sleeve 30 is integrally formed at one corner of the box-like walls 29 for receiving the threaded end of the hold-down bolt 15. As shown in FIG. 1, the wing nut 16 is screwed on the bolt 15 and engages the flat top portion 28 of the connecting portion 21 of the strap 10.

In keeping with the invention, the access covers 25 are hinged adjacent the upper portion of the longitudinal wall 22 and means are provided for latching the cover adjacent the upper portion of the other longitudinal wall 23. As shown, the cover 25 is generally flat and closes the space defined between the cross wall 26 and the partial end wall 27 as well as the longitudinal walls 22, 23. It will be appreciated, of course, that the cover 25 could be hinged along one of its other edges, or alternatively, could even be a slidable or snap fit cover, if desired. Similarly, the cover could form only a portion of a top plate of the terminal enclosing means or could be located on one of the longitudinal walls 22, 23. Preferably, each of the covers 25 is provided with indicia to designate the respective positive (+) and negative (−) terminals of the battery.

To hold the covers 25 closed, they are each provided with suitable latch means. While various latch arrangements could be used, in the illustrated embodiment, each cover 25 is formed with an integral latch tab 35 and the adjacent longitudinal wall is provided with a cooperating latch element in the form of a protruding lug 36. Preferably, the tab 35 is formed with an inclined cam portion 37 adapted to cam the tab 35 outwardly over the lug 36 which snaps into a latch aperture 38 in the tab 35. It will be seen that the inclined portion 37 also provides a convenient portion to grip with a finger to unlatch the tab 35 from the lug 36. Thus, the covers 25 can be readily unlatched and hinged open to permit inspection of the battery terminals for corrosion or for tightening, connecting or disconnecting the battery cable clamps. Likewise, by opening the covers 25 convenient access is provided to the terminals 17 and cable connectors 19 when it is desired to electrically test the battery or to make connections to the terminals for charging or "jumping" the battery.

The combination hold-down strap and terminal protector 10 is preferably formed of an insulating plastic material such as polypropylene or the like which is also acid and corrosion resistant. In addition to protecting the terminals from acid and contamination and electrical short-circuits and shocks to personnel, the integrally formed hinge and latch elements of the covers 25 do not suffer from corrosion. It will be appreciated that the strap 10 can be economically formed, such as by injection molding with relatively thin wall sections and yet due to the general channel shape it possesses good strength and stiffness for its weight. Also one or more intermediate webs 39 may be employed to further increase the stiffness of the strap 10 and the wall 23 is relieved near its ends as at 40 to provide access for the cable 18 into the terminal protecting means.

I claim as my invention:

1. A hold-down strap and electrical terminal protector for a storage battery having electrical terminals projecting from the upper surface thereof, comprising, in combination, an elongated body having a length substantially equal to the length of the battery and a width substantially less than the width of the battery, a connecting portion at each end of said body adapted to receive and cooperate with a hold-down connector secured to means for supporting the battery and means inboard of said connecting portions for substantially enclosing each of said battery terminals, said terminal enclosing means including a selectively openable access cover.

2. A hold-down strap as defined in claim 1 wherein said body has a generally inverted channel shape including a pair of generally vertical longitudinal walls interconnected by at least one cross member.

3. A hold-down strap as defined in claim 2 wherein said terminal enclosing means are defined in part by said longitudinal walls and said access cover is disposed over and between said walls.

4. A hold-down strap as defined in claim 3 wherein said access cover is hinged adjacent the upper portion of one of said walls and means are provided for latching said cover adjacent the upper portion of the other of said walls.

5. A hold-down strap as defined in claim 4 wherein said body is molded of plastic material and said hinged access covers are integrally formed therewith.

6. A hold-down strap as defined in claim 5 wherein said access covers are formed with integral latch tabs and said other wall is provided with a cooperating latch element.

7. A hold-down strap as defined in claim 6 wherein said latch tab is formed with an aperture and said latch element is a protruding lug.

8. A hold-down strap as defined in claim 7 wherein said latch tab is formed with an inclined cam surface adapted to cam said tab outwardly over said lug before said aperture snaps over said lug.

9. A hold-down strap as defined in claim 1 wherein each of said access covers is provided with battery polarity indicia for the respective positive and negative terminals of the battery.

10. A battery hold-down strap as defined in claim 3 wherein said body includes a cross wall extending between said longitudinal walls and defining a third wall of said terminal enclosing means.

11. A battery hold-down strap as defined in claim 10 wherein said body includes a stiffing element extending between said longitudinal walls intermediate said cross walls.

12. A battery hold-down strap as defined in claim 3 including a generally horizontal web extending between said longitudinal walls and said access covers.

13. A battery hold-down strap as defined in claim 1 wherein said body is provided with an aperture at each end thereof opening into said terminal enclosing means for receiving a battery cable.

14. A hold-down strap as defined in claim 2 wherein said body includes a wall portion at each end connected to one of said longitudinal walls and defining a portion of said terminal enclosing means.

15. A hold-down strap as defined in claim 14 wherein said connecting portion extends outwardly from said one longitudinal wall and said end wall portion.

16. A hold-down strap as defined in claim 15 wherein said connecting portion is formed with a substantially flat top portion and generally box-like side walls.

17. A hold-down strap as defined in claim 16 wherein said connecting portion includes a generally cylindrical sleeve disposed at one corner of said box like side walls.

18. A hold-down strap as defined in claim 14 wherein said body is made of plastic material and said access cover is integrally formed therewith and hinged adjacent the upper portion of one of said walls and means are provided for latching said cover adjacent the upper portion of the other of said walls.

19. A hold-down strap as defined in claim 18 wherein said latching means includes an apertured latch tab on said cover and a protruding lug on said other wall, said tab having a cam surface for engaging said lug to snap said aperture thereover.

20. A hold-down strap as defined in claim 10 wherein said body includes an end wall portion at each end thereof defining a portion of said terminal enclosing means and said connecting portion extends outwardly from said one longitudinal wall and said end wall portion.

* * * * *

UNITED STATES PATENT AND TRADEMARK OFFICE
CERTIFICATE OF CORRECTION

PATENT NO. : 4,562,125
DATED : December 31, 1985
INVENTOR(S) : Robert K. Davis

It is certified that error appears in the above-identified patent and that said Letters Patent is hereby corrected as shown below:

On the Cover Page:

The name of the executor should be corrected from "Clerie R. Davis" to "Clevie R. Davis"

Signed and Sealed this

Twenty-seventh Day of May 1986

[SEAL]

Attest:

DONALD J. QUIGG

Attesting Officer

Commissioner of Patents and Trademarks